United States Patent
Gupta et al.

(10) Patent No.: US 7,328,185 B1
(45) Date of Patent: Feb. 5, 2008

(54) HANDLING ORDER (PROXY) BIDS IN AN ON-LINE AUCTION

(75) Inventors: Manish Gupta, New Delhi (IN); Anant D. Jhingran, San Jose, CA (US); Manoj Kumar, Yorktown Heights, NY (US); Karthikeyan Seetharaman, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 1385 days.

(21) Appl. No.: 09/721,093

(22) Filed: Nov. 22, 2000

Related U.S. Application Data (60) Provisional application No. 60/185,401, filed on Feb. 28, 2000.

(51) Int. Cl.
  *G06Q 40/00* (2006.01)
(52) U.S. Cl. .............................. 705/37; 705/36; 705/35; 705/5; 705/26
(58) Field of Classification Search .................. 705/37, 705/8, 69, 35, 36, 38, 34
  See application file for complete search history.

(56) References Cited

U.S. PATENT DOCUMENTS

| | | | |
|---|---|---|---|
| 6,157,920 A * | 12/2000 | Jakobsson et al. ............ | 705/69 |
| 6,321,207 B1 * | 11/2001 | Ye ................................ | 705/8 |
| 6,374,227 B1 * | 4/2002 | Ye ................................ | 705/8 |
| 6,609,112 B1 * | 8/2003 | Boarman et al. ............. | 705/37 |
| 6,907,405 B2 * | 6/2005 | Brett ............................ | 705/37 |

OTHER PUBLICATIONS

Fredrick M. Biddle. The Wall Street Journal, LockheedAsset Sales May Fall—Coming Proposal Is Unlikely to Satisfy U.S. Demands For Acquiring Northrop,New York, New York: Mar. 1, 1998.p. 1).*
John Racine, Lastly Richardson, Tex., Modified Dutch Auction to increase Debth Menufor Residents, New York , New , York: Mar. 5, 1993. vol. 303, Iss. 29103; p. 3).*

* cited by examiner

*Primary Examiner*—Kambiz Abdi
*Assistant Examiner*—Clement Graham
(74) *Attorney, Agent, or Firm*—Duke W. Yee; Douglas W. Cameron; Gerald H. Glanzman

(57) ABSTRACT

A method and apparatus for generating bids for bidding agents in an auction. Bids are sorted by decreasing bid amount for regular bids and upper limit for order bids to form a sorted set of bids, wherein each bid includes a quantity and wherein the bids include order bids. A first bid is identified requesting a quantity in which an unallocatable portion is present. A number of order bids is selected from the bids, wherein the number of order bids are higher in the sorted set of bids than the first bid and have an allocation requirement less than the unallocatable portion of the of the first bid. A price is set for the order bids higher than the first bid and not in the aforementioned selected bids.

27 Claims, 4 Drawing Sheets

```
q_avail =
q_on_stack = 0 ;

while (((q_avail > 0) || (q_on_stack > 0))&&(~EOL)) {
   If (current->q_need <= q_availabble) { // Full allocation
      If (This is an order bid) Stock_it
   }
   Else {
      If (current_bid is an partial bid) {short_fall = 1}
      Else {Shortfall = current->q_need - q_available} ;
      While (Shortfall <= q_on_stack) {
         price bids on stock ;/* Current bid is displacing them */
      }

If (current bid is an order_bid) {
         Put bid on stack ;
         Increment q_on_stack ;
      }
}

While (((q_avail > 0) || (q_on_stack > 0))&&EOL) {
         price bids on stock ; /* No bids are displacing them */
}
```

HANDLING ORDER (PROXY) BIDS IN AN ON-LINE AUCTION

REFERENCE TO PROVISIONAL APPLICATION

This application claims the benefit of the filing date of corresponding U.S. Provisional Patent Application No. 60/185,401, entitled "Handling Order (Proxy) Bids in an On-Line Auction", filed Feb. 28, 2000.

BACKGROUND OF THE INVENTION

1. Technical Field

The present invention relates generally to an improved data processing system, and in particular to a method and apparatus for handling order bids in an on-line auction. Still more particularly, the present invention provides a method and apparatus for setting bids for bidding agents in an on-line auction.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name server (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Auctions or brokered sales are another form of business activity on the Internet. These auctions are similar to those in real world auctions. As with real world auctions, some buyers may not have sufficient time to participate in an Internet or on-line auction. In such a case, a proxy or bidding agent may be used to submit bids on behalf of the buyer and in the best interest of the buyer. Further, Internet auctions often run for periods of time longer than real world auctions. In this situation, having bidding agents to provide proxy or order bid services for a buyer is equally important in Internet auctions.

One problem occurring with the use of bidding agents in Internet auctions is a situation in which two or more bidding agents enter a bidding war submitting a sequence of bids with each bid beating a prior bid by the minimum bid increment. This behavior causes a very large number of bids to be submitted, which in turn causes the bid tables to become excessively large. This situation places a strain on system resources as well as an inconvenience to other buyers who have to scan through a large number of bids.

Therefore, it would be advantageous to have an improved method and apparatus for providing bidding agents which do not generate large numbers of bids.

SUMMARY OF THE INVENTION

The present invention provides a method and apparatus for generating bids for bidding agents in an auction. Bids are sorted by decreasing bid amount for regular bids and upper limit for order bids to form a sorted set of bids, wherein each bid includes a quantity and wherein the bids include order bids. A first bid is identified requesting a quantity in which an unallocatable portion is present. A number of order bids is selected from the bids, wherein the number of order bids are higher in the sorted set of bids than the first bid and have an allocation requirement less than the unallocatable portion of the of the first bid. A price is set for all order bids higher than the first bid in the sorted set but not in the aforementioned selected number of order bids.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
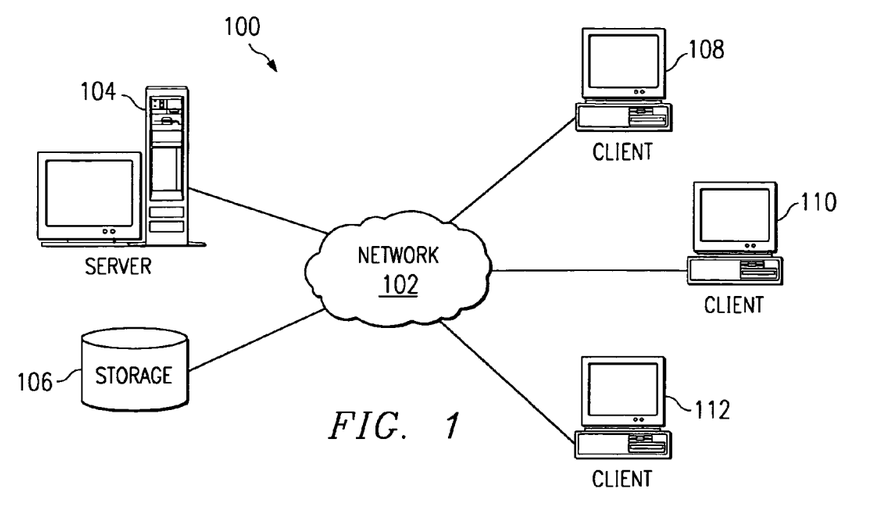
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. In these particular examples, server 104 may host an on-line auction. Clients 108, 110, and 112 may receive information on items that are to be auctioned and submit bids for those items.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
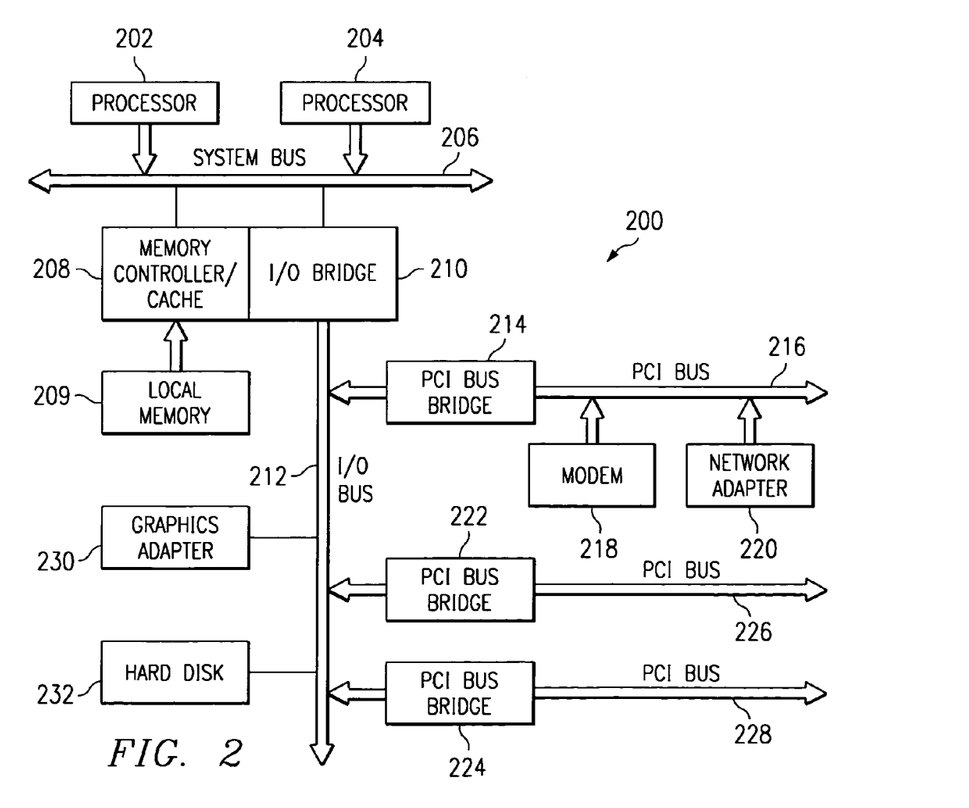
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Server 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
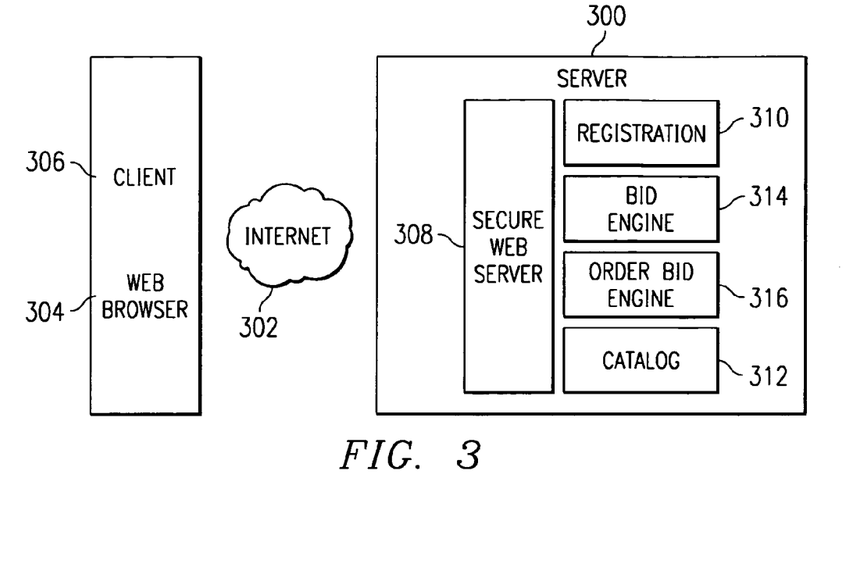
FIG. 3 is a diagram illustrating components used in an Internet auction in accordance with a preferred embodiment of the present invention.

Turning next to FIG. 3, a diagram illustrating components used in an Internet auction is depicted in accordance with a preferred embodiment of the present invention. In this example, server 300 hosts auction services, which may be accessed across Internet 302. For example, a buyer or user located on web browser 304 in client 306. Through web browser 304, the buyer may receive information on items being auctioned on server 300 as well as submit bids for those items. In this example, server 300 includes a secure web server 308, which is used to receive and process requests for information and bids. In this example, secure web server 308 uses various known encryption techniques to provide privacy and security for buyers submitting bids. Secure web server 308 sends received requests to appropriate components, such as registration 310, catalog 312, bid engine 314, and order bid engine 316 for processing. Additionally, secure web server 308 will receive results and format those results for return to the originator of the requests. In these examples, the requests are received in an HTTP format and placed in the appropriate form for use by other components in server 300. Further, secure web server 308 will reformat the responses from these components into the appropriate form for return to the requester.

Registration 310 is used to identify and register buyers who participate in the auctions. Catalog 312 in these examples are used to provide information, such as identification of items being auctioned as well as quantities of these items and descriptions of the items. Bid engine 314 provides bid handling processes to analyze received bids, identify winners of auctions, and set prices for the items. Bid engine 314 may handle a single auction or many auctions.

In the depicted examples, order bid engine 316 contains the processes of the present invention used to provide order bid services. Order bid engine 316 may contain a number of bidding agents used to provide these services for buyers who are unable to participate in the auction.

The components shown in FIG. 3 are for illustrative purposes and not meant as limitations to the implementation of the present invention. Other components may be used in addition to or in place of the illustrated components for providing auction services. For example, client 306 may be a pervasive/mobile device accessing auction functions using WAP protocol through WAP gateways.

The present invention provides a method, apparatus, and computer implemented instructions for providing order bid services. The mechanism of the present invention calculates a final equilibrium position that would be reached by bidding agents if they were to engage in a bidding war. A bid is submitted for each bidding agent at this equilibrium position. This mechanism eliminates the occurrence of large sequences of bids at small or minimal increments being generated by bidding agents. As used herein, a bidding agent is a program or other computer implemented process used to generate bids on behalf of a buyer.

Figure 4:
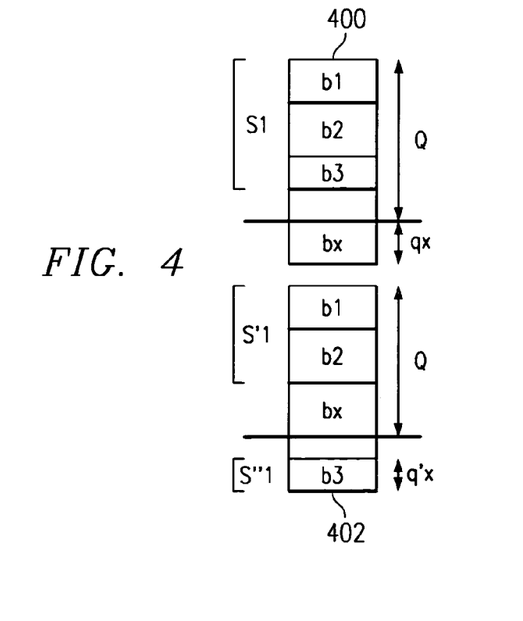
FIG. 4 is a diagram illustrating a process for setting prices for order bids in accordance with a preferred embodiment of the present invention.

Turning next to FIG. 4, a diagram illustrating a process for setting prices for order bids is depicted in accordance with a preferred embodiment of the present invention. Stack 400 contains bids b1, b2, b3, and bx. In this auction, the quantity Q represents the total quantity of items available in the auction. The quantity qx represents a shortfall in the items. In this example, bid bx cannot be fully allocated because the available quantity Q has a shortfall qx. In setting prices paid by order bids, order bids are priced above the bid bx such that the unpriced quantity is less than the shortfall qx.

In this example, the order bids in S1 are b1, b2, and b3. Of course, in other cases bids b1 and b2 may not be order bids. Also, the process of the present invention may work with any number of bids. The four bids shown are only for purposes of illustration. These order bids have to collectively bid enough to dislodge the bid bx. In stack 400, the shortfall qx is greater than zero. A subset S"1 is selected from S1 as shown in stack 402. In this example, subset S"1 contains the order bid b3. For purposes of illustration, only a single order bid is illustrated, but subset S"1 may contain multiple order bids. The selection criteria for bids in subset S"1 are numerous. For example, these bids may be selected based on the time when a bid is received or posted, on the upper limit of the order bid, or as a subset of bids, which minimize revenue that is lost. The upper limit for an order bid is the highest price that will be bid for an item. Another selection criteria may be for bids, which accept partial allocations. A bid, which accepts a partial allocation, is one that requests a set quantity, but will accept a lesser quantity. The order bids in subset S'1 are governed or set based on order bid bx. The quantity q'x for order bid b3 is less than the shortfall. These positions or groupings of bids form a final equilibrium position from which pricing of bids may occur.

This process may be repeated for any remaining order bids or any remaining quantity. In this example, the remaining quantity is qx minus q'x. This process provides a realistic bidding mechanism for bidding agents. A real buyer would bid less than the bid provided by bid bx if the buyer knew that the quantity requested by bid bx could not be fulfilled by the available quantities left after the other bids have been taken into account.

Figure 5:
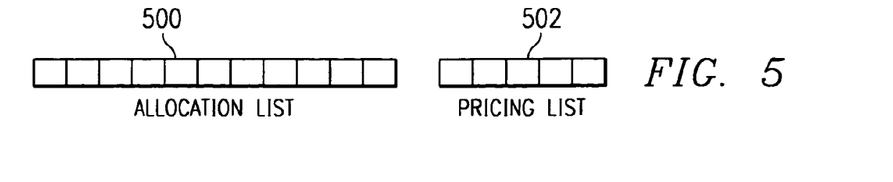
FIG. 5 is a diagram illustrating data structures used to process bids in accordance with a preferred embodiment of the present invention.

Turning next to FIG. 5, a diagram illustrating data structures used to process bids is depicted in accordance with a preferred embodiment of the present invention. Allocation list 500 is a data structure containing all bids received, both order bids and non-order bids. The bids are organized in allocation list 500 by decreasing per unit bid. In other words, these bids are placed from highest amount to lowest amount on a per item or unit basis. Order bids are placed into allocation list 500 based on the upper limit for an order bid.

Allocation list 500 is scanned sequentially from the highest to lowest to allocate quantities to these bids. In some cases, a bid may not be fully allocated. In this situation the shortfall is used to price order bids. An order bid is placed into pricing list 502 when the order bid is to be allocated some quantity. The ordering of bids within pricing list 502 may be based on different policies. For example, the order of bids may be based on the time when an order bid is received or posted or on the upper limit of an order bid. Order bids within pricing list 502 have been allocated a quantity, but do not yet have a bid value at this point. Allocation list 500 and pricing list 502 are data structures, which may take various forms, such as, for example, a table, a linked list, or a database.

Using pricing list 502, a set of order bids within pricing list 502 is identified for which the total quantity requested or demanded is less than a shortfall for a particular bid within allocation list 500. All remaining bids within pricing list 502 are priced to beat the price for this particular bid unless the prices for these bids already beat the particular bid. If this particular bid is an order bid, then the upper limit of this order bid has to be beaten.

Figure 6:
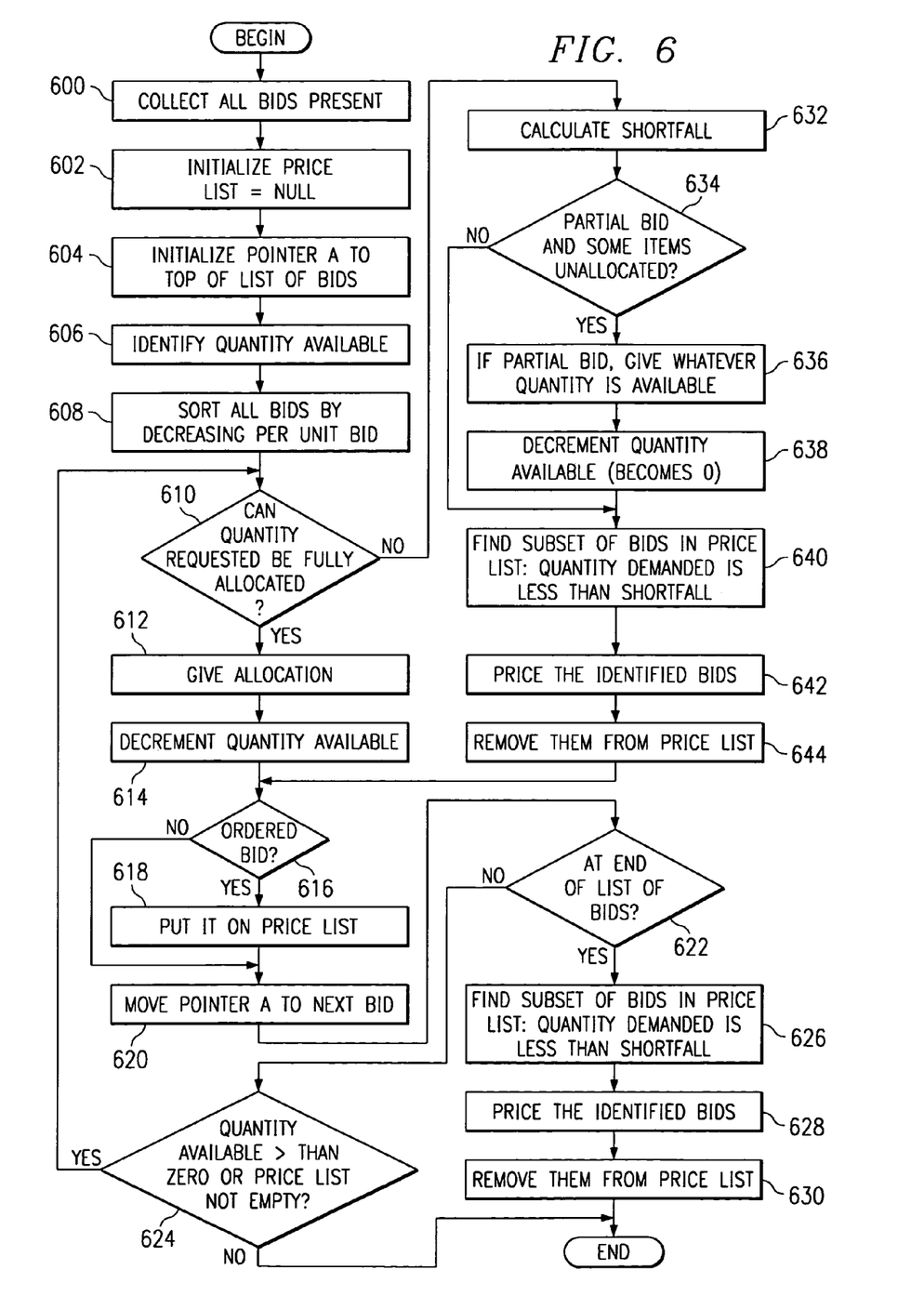
FIG. 6 is a flowchart of a process used for allocating quantities to bids in accordance with a preferred embodiment of the present invention.

Turning next to FIG. 6, a flowchart of a process used for allocating quantities to bids is depicted in accordance with a preferred embodiment of the present invention. This process is implemented in a order bid engine, such as order bid engine 316 in FIG. 3 in these examples.

The process begins by collecting all bids present and placing the bids in a list of bids (step 600). In this example, the bids present are all of the bids that have been posted to the server at the time this process is initiated. In this example, the list of bids takes the form of a data structure, such as allocation list 500 in FIG. 5. A price list is initialized to NULL (step 602). In other words, the price list is empty at this point. In this example, the price list may be implemented using pricing list 502 in FIG. 5. A pointer A is initialized to point to the top of the list of bids (step 604). The quantity available is then identified (step 606). The bids in the list of bids are sorted by decreasing per unit bid (step 608).

A determination is made as to whether the quantity requested by a bid can be fully allocated (step 610). If the quantity requested can be fully allocated, then the allocation requested is given (step 612). Next, the quantity available is then decremented (step 614). The quantity decremented is based on the amount allocated in step 614. A determination is made as to whether the bid is an ordered bid (step 616). If the bid is an ordered bid, the bid is placed on a price list (step 618). Pointer A is then moved to the next bid on the list of bids (step 620). Thereafter, a determination is made as to whether the end of the list has been reached (step 622). If the end of the list has not been reached, the process determines whether some unallocated items or unpriced order bids are present in the price list (step 624). If either of the two checks are true, the process returns to step 610. If both statements are false, the algorithm terminates.

If the end of the list has been reached in step 622, a subset of bids in the price list is found in which the quantity demanded is less than the shortfall (step 626). Next, the identified bids are priced (step 628). These bids are then removed from the price list (step 630) with the process terminating thereafter.

With reference again to step 610, if the quantity requested cannot be fully allocated or the bid is not a partial bid, the shortfall in the quantity is calculated (step 632). In step 632, the shortfall calculation is as follows: if the bid is a partial bid, the shortfall is 2; else the shortfall is the difference between the quantity demanded and the quantity available. Next, a determination is made as to whether the bid is a partial bid and some items are unallocated (step 634). If this determination is true, the bid receives whatever quantity is available (step 636), and the available quantity is decremented to zero (step 638). Then, a subset of bids in the price list is identified in which the quantity demanded by these bids is less than the shortfall (step 640). The identified bids are skipped and the remaining bids are priced (step 642). These bids that have been priced are then removed from the price list (step 644). The process then returns to step 616.

With reference again to step 634, if a partial bid is not present or some items or no items are unallocated, the process proceeds directly to step 640 as described above.

Figure 7:
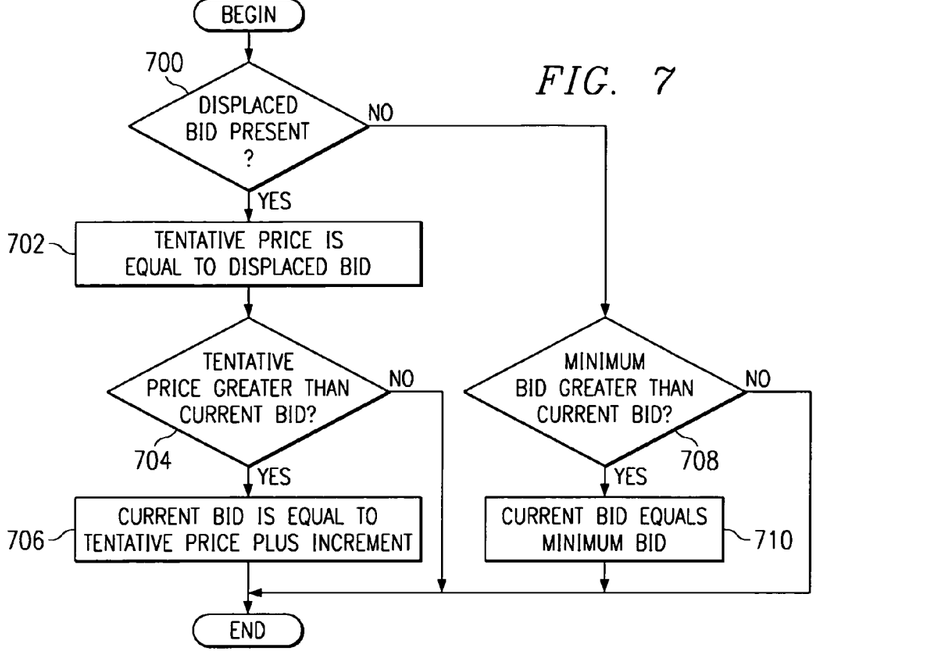
FIG. 7 is a flowchart of a process used for pricing order bids in accordance with a preferred embodiment of the present invention.

Turning next to FIG. 7, a flowchart of a process used for pricing order bids is depicted in accordance with a preferred embodiment of the present invention. This process is used to price order bids that have been placed into a price list, such as the one described in step 618 in FIG. 6 above.

First, a determination is made as to whether a displaced bid is present i.e., there is a bid which did not receive full allocation (step 700). A displaced bid is a bid corresponding to an order bid that has lost its ranking order because of a new bid in the system. If a displaced bid is present, then the tentative price for bid is set equal to the displaced bid (step 702). Next, a determination is made as to whether the tentative price is greater than the current bid (step 704). The current bid is the price that is currently set for a bid on a per item basis in these examples. If the tentative price is greater than the current bid, the current bid is set equal to the tentative price plus an increment (step 706) with the process terminating thereafter. This increment may be set a number of different ways. For example, one could have an increment requirement as 5 above the current lowest winning bid, if the current lowest winning bid is between 5 and 500, and 50 above the current lowest winning bid if the current lowest winning bid is between 500 and 50,000. The increment may be a fixed number defined by the auction rules, or a function of the tentative bid.

With reference again to step 704, if the tentative price is not greater than the current bid, the process terminates. Turning back to step 700, if a displaced bid is not present, a determination is made as to whether the minimum bid is greater than the current bid (step 708). The minimum bid is the minimum amount required to be bid for an item. If the minimum bid is greater than the current bid, the current bid is set equal to the minimum bid (step 710) with the process terminating thereafter. The process terminates in step 708 if the minimum bid is not greater than the current bid.

Figure 8:
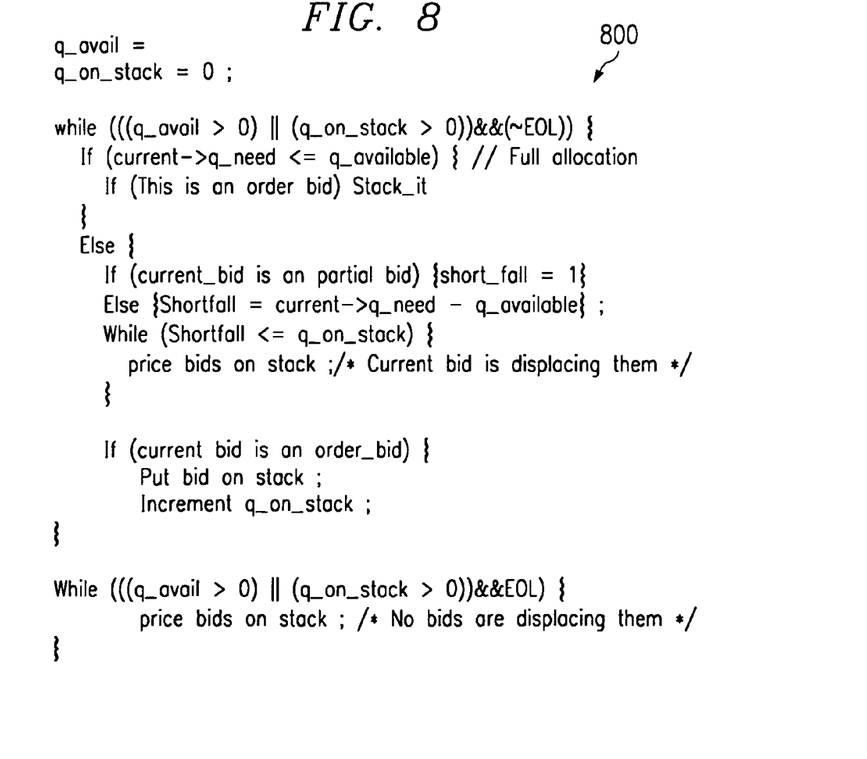
FIG. 8 is a diagram illustrating a code segment for processing order bids in accordance with a preferred embodiment of the present invention.

Turning next to FIG. 8, a diagram illustrating a code segment for processing order bids is depicted in accordance with a preferred embodiment of the present invention. Code 800 illustrates code used to allocate quantities of items to bids. This code implements the process illustrated in FIG. 6 above.

The processes used to allocate quantities and provide pricing may be executed at different times. For example, these processes may be executed periodically or after a selected number of bids have been received. Additionally, these processes may be run based on an estimate of the mid-point of an auction at a time before the auction closes. In such a case, the process is run when the estimated mid-point of the auction occurs. Alternatively, these processes could be run at some percentage or time period prior to when the auction is estimated or scheduled to close.

Thus, the present invention provides an improved method, apparatus, and computer implemented instructions for handling order bids in an on-line auction, such as those that occur on the Internet. The mechanism of the present invention eliminates situations in which a bidding war occurs between two or more bidding agents in which a sequence of bids are submitted with each bid beating a prior bid by the minimum bid increment. By eliminating this situation, the amount of system resources required to run an on-line auction and the inconvenience to bidders caused by having to review large numbers of bids is reduced. This advantage is provided, in the examples, through estimating or determining the final equilibrium position between bidding agents if such a bidding war were to occur. Then, a bid is submitted for each of the bidding agents based on this final equilibrium position.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the system is illustrated with respect to auctions on the Internet, these processes may be applied to other types of auctions, such as those on an intranet or on a local area network. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for generating bids for an auction, the method comprising:

sorting a plurality of bids for a set of bidding agents by decreasing bid amount to form a sorted set of bids, wherein bids for the set of bidding agents are sorted using upper limits for the bids for the set of bidding agents;

identifying a first bid from the plurality of bids for which an unallocatable portion of a requested quantity is present;

selecting a number of bids from the plurality of bids, wherein the number of bids is higher in the sorted set of bids than the first bid and wherein each bid in the number of bids has an allocation requirement less than the unallocatable portion of the first bid;

setting a price for the number of bids to form a final equilibrium price; and submitting a bid, in the data processing system, for each of the bidding agents based on the final equilibrium price.

2. The method of claim 1, wherein the sorting step, identifying step, selecting step, and setting step are repeated for unallocated items, remaining bids, and remaining unpriced order bids.

3. A method, in a data processing system, for generating bids for bidding agents in an auction, the method comprising:

sorting a plurality of bids by decreasing bid amount to form a sorted set of bids, wherein each bid includes a quantity and wherein the plurality of bids includes order bids;

identifying a first bid requesting a quantity for which an unallocatable portion is present;

selecting a number of order bids from the plurality of bids, wherein the number of order bids is higher in the sorted set of bids than the first bid and wherein each bid in a number of bids has an allocation requirement less than the unallocatable portion of the first bid; and setting a price, in the data processing system, for the number of order bids to form a final equilibrium price.

4. The method of claim 3, wherein the number of order bids is a single order bid.

5. The method of claim 3, wherein each bid in the number of order bids is selected from the plurality of bids based on the allocation requirement, upper limit, and a time when each order bid in the number of order bids was received.

6. The method of claim 3, wherein each order bid in the number of order bids is selected from the plurality of bids based on the allocation requirement and an upper limit.

7. The method of claim 3, wherein each bid in the number of order bids is selected based on the allocation requirement and the number of order bids maximize revenue.

8. The method of claim 3, further comprising:

repeating the selecting and setting steps for any remaining portion of the unallocatable portion and any remaining order bids in the plurality of bids.

9. The method of claim 3, wherein the price of the number of order bids is less than a price for the first bid.

10. The method of claim 3, wherein the number of order bids includes a bid accepting a partial allocation of a quantity for the bid.

11. A data processing system comprising:

a bus system;

a communications unit connected to the bus system;

a memory connected to the bus system, wherein the memory includes a set of instructions; and a processing unit connected to the bus system, wherein the processing unit executes the set of instructions to receive a plurality of bids through the communications unit, sort the plurality of bids by decreasing bid amount to form a sorted set of bids in which each bid includes a quantity and the plurality of bids includes order bids, identify a first bid within the sorted set of bids having a quantity in which an unallocatable portion is present, select a number of order bids from the plurality of bids in which number of order bids are higher in the sorted set of bids than the first bid and wherein the each bid in a number of bids has an allocation requirement less than the unallocatable portion of the first bid, and set a price for the number of order bids.

12. The data processing system of claim 11, wherein the bus system is a single bus.

13. The data processing system of claim 11, wherein the bus system includes a primary bus and a secondary bus.

14. The data processing system of claim 11, wherein the processing unit includes a plurality of processors.

15. The data processing system of claim 11, wherein the communications unit is one of a modem and Ethernet adapter.

16. A data processing system for generating bids for an auction, the data processing system comprising:

sorting means for sorting a plurality of bids for a set of bidding agents by decreasing bid amount to form a sorted set of bids, wherein bids for the set of bidding agents are sorted using upper limits for the bids for the set of bidding agents;

identifying means for identifying a first bid from the plurality of bids for which an unallocatable portion of a requested quantity is present;

selecting means for selecting a number of bids from the plurality of bids, wherein the number of bids is higher in the sorted set of bids than the first bid and wherein each bid in the number of bids has an allocation requirement less than the unallocatable portion of the first bid;

setting means for setting a price for the number of bids to form a final equilibrium price; and submitting means for submitting a bid for each of the bidding agents based on the final equilibrium.

17. The data processing system of claim 16, wherein the sorting means, identifying means, selecting means, and setting means are repeated for unallocated items, remaining bids, and remaining unpriced order bids.

18. A data processing system for generating bids for bidding agents in an auction, the data processing system comprising:

sorting means for sorting a plurality of bids by decreasing bid amount to form a sorted set of bids, wherein each bid includes a quantity and wherein the plurality of bids includes order bids;

identifying means for identifying a first bid requesting a quantity in which an unallocatable portion is present;

selecting means for selecting a number of order bids from the plurality of bids, wherein the number of order bids are higher in the sorted set of bids than the first bid wherein the each bid in a number of bids has an allocation requirement less than the unallocatable portion of the first bid; and setting means for setting a price for the number of order bids.

19. The data processing system of claim 18, wherein the number of order bids is a single order bid.

20. The data processing system of claim 18, wherein each bid in the number of order bids is selected from the plurality of bids based on the allocation requirement, upper limit, and a time when each order bid in the number of order bids was received.

21. The data processing system of claim 18, wherein each order bid in the number of order bids is selected from the plurality of bids based on the allocation requirement and an upper limit.

22. The data processing system of claim 18, wherein each bid in the number of order bids is selected based on the allocation requirement and the number of order bids maximize revenue.

23. The data processing system of claim 18 further comprising:
repeating means for repeating initiation of the selecting means and setting means for any remaining portion of the unallocatable portion and any remaining order bids in the plurality of bids.

24. The data processing system of claim 18, wherein the price of the number of order bids is less than a price for the first bid.

25. The data processing system of claim 18, wherein the number of order bids includes a bid accepting a partial allocation of a quantity for the bid.

26. A computer program product in a computer readable medium for generating bids for an auction, the computer program product comprising:
first instructions for sorting a plurality of bids for a set of bidding agents by decreasing bid amount to form a sorted set of bids, wherein bids for the set of bidding agents are sorted using upper limits for the bids for the set of bidding agents;
second instructions for identifying a first bid from the plurality of bids for which an unallocatable portion of a requested quantity is present;
third instructions for selecting a number of bids from the plurality of bids, wherein the number of bids is higher in the sorted set of bids than the first bid and wherein each bid in the number of bids has an allocation requirement less than the unallocatable portion of the first bid;
fourth instructions for setting a price for the number of bids to form a final equilibrium price; and
fifth instructions for submitting a bid for each of the bidding agents based on the final equilibrium.

27. A computer program product in a computer readable medium for generating bids for bidding agents in an auction, the computer program product comprising:
first instructions for sorting a plurality of bids by decreasing bid amount to form a sorted set of bids, wherein each bid includes a quantity and wherein the plurality of bids includes order bids;
second instructions for identifying a first bid requesting a quantity for which an unallocatable portion is present;
third instructions for selecting a number of order bids from the plurality of bids, wherein the number of order bids are higher in the sorted set of bids than the first bid and wherein the each bid in a number of bids has an allocation requirement less than the unallocatable portion of the first bid; and fourth instructions for setting a price for the number of order bids.

* * * * *